United States Patent
Wu et al.

(10) Patent No.: US 7,565,020 B2
(45) Date of Patent: Jul. 21, 2009

(54) SYSTEM AND METHOD FOR IMAGE CODING EMPLOYING A HYBRID DIRECTIONAL PREDICTION AND WAVELET LIFTING

(75) Inventors: Feng Wu, Beijing (CN); Shipeng Li, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 706 days.

(21) Appl. No.: 10/884,230

(22) Filed: Jul. 3, 2004

(65) Prior Publication Data
US 2006/0008164 A1    Jan. 12, 2006

(51) Int. Cl.
G06K 9/36    (2006.01)
(52) U.S. Cl. .................. 382/238; 382/232; 382/240; 348/394.1
(58) Field of Classification Search ......... 382/232, 382/240, 238; 348/394.1
See application file for complete search history.

(56) References Cited

U.S. PATENT DOCUMENTS

| | | | |
|---|---|---|---|
| 5,778,192 A * | 7/1998 | Schuster et al. | 382/232 |
| 6,215,905 B1 * | 4/2001 | Lee et al. | 382/238 |
| 6,546,143 B1 * | 4/2003 | Taubman et al. | 382/240 |
| 6,978,048 B1 * | 12/2005 | Higginbottom et al. | 382/240 |
| 2003/0053702 A1 * | 3/2003 | Hu | 382/240 |
| 2003/0112864 A1 * | 6/2003 | Karczewicz et al. | 375/240.01 |
| 2003/0223645 A1 * | 12/2003 | Sun et al. | 382/239 |
| 2005/0196060 A1 * | 9/2005 | Wang et al. | 382/240 |

OTHER PUBLICATIONS

Andreopoulos, Y., A. Munteanu, G. Auwera, P. Schelkens, and J. Cornelis, Wavelet-based fully-scalable video coding with in-band prediction, *Proc. 3rd IEEE Benelux Signal Processing Symposium (SPS-2002)*, Leuven, Belgium, Mar. 21-22, 2002.

Bamberger, R. H., and M. Smith, Narrow band analysis of a filter bank for the directional decomposition of images, *Int'l Conf. on Acoustics, Speech, and Signal Processing, ICASSP '90*, 1990, vol. 3, pp. 1739-1742.

Boulgouris, N. V., D. Tzovaras, and M. G. Strintzis, Lossless image compression based on optimal prediction, adaptive lifting, and conditional arithmetic coding, *IEEE Trans. on Image Proc.*, 2001, vol. 10, No. 1, pp. 1-14.

Candès, E. J., and D. L. Donoho, Curvelets—A surprisingly effective nonadaptive representation for objects with edges, *Technical Report*, Department of Statistics, Stanford University, 1999.

Candès, E. J., Monoscale ridgelets for the representation of images with edges, *Technical Report*, Department of Statistics, Stanford University, 1999.

Daubechies, I., and W. Sweldens, Factoring wavelets transforms into lifting steps, *J. of Fourier Anal. Appl.*, 1998, vol. 4, No. 3, pp. 247-269.

(Continued)

*Primary Examiner*—Vikkram Bali
*Assistant Examiner*—Daniel Zeilberger
(74) *Attorney, Agent, or Firm*—Lyon & Harr, LLP; Katrina A. Lyon

(57) ABSTRACT

A system and method that provides an efficient scheme to code images and video by exploiting spatial correlations within an image by employing hybrid directional prediction and lifting wavelet techniques.

27 Claims, 10 Drawing Sheets

OTHER PUBLICATIONS

Feig, E., H. Peterson, and V. Ratnakar, Image compression using spatial prediction, *ICASSP*, 1995, vol. 4, pp. 2339-2342.

Gnavis, S., B. Penna, M. Grangetto, E. Magli, G. Olmo, Wavelet kernels on a DSP: A comparison between lifting and filter banks for image coding, Applied Signal Processing, Sep. 2002, vol. 2002, No. 9, pp. 981-989.

Kim, C.-S., R.-C. Kim, and S.-U. Lee, Fractal coding of video sequence using circular prediction mapping and noncontractive interframe mapping, *IEEE Trans. on Image Processing*, 1998, vol. 7, No. 4, pp. 601-605.

Kondo, H., and Y. Oishi, Digital image compression using directional sub-block DCT, *Int'l Conf. on Comm. Tech.*, 2000, vol. 1, pp. 21-25.

Li, H., and Z. He, Directional subband coding of images, *ICASSP*, 1989, vol. 3, pp. 1823-1826.

Mahesh, B., and W. A. Pearlman, Hexagonal sub-band coding of images, *ICASSP*, 1989, vol. 3, pp. 1953-1956.

Neelamani, R., Wavelet transforms via lifting, Department of Electrical and Computer Engineering, Rice University, 1998.

Pau, G., C. Tillier, B. Pesquet-Popescu, Optimization of the predict operator in lifting-based motion compensated temporal filtering, *Proc. of SPIE Visual Communications and Image Processing (VCIP)*, San Jose, CA, Jan. 2004.

Ramaswarmy, V. N., K. R. Namuduri, R. Ranganathan, Lossless image compression using wavelet decomposition, *IEEE Proceedings of ICPR*, 1996, pp. 924-928.

Said, A., and W. A. Pearlman. A new fast and efficient image codec based on set partitioning in hierarchial trees, *IEEE Trans. on Circuits and Systems for Video Tech.*, Jun. 1996, pp. 243-250.

Schelkens, P., Y. Andreopoulos, J. Barbarien, T. Clerckx, F. Verdicchio, A. Munteanu, M. Schaar, A comparative study of scalable video coding schemes utilizing wavelet technology, *Proceedings of SPIE Photonics East, Wavelet applications in industrial processing*, Providence, Rhode Island, Oct. 2003, vol. 5266, pp. 147-156.

Shapiro, J., Embedded image coding using zerotrees of wavelet coefficients, *IEEE Trans. Signal Processing*, Dec. 1993, vol. 41, pp. 3445-3462.

Somasundaram, S., and K. P. Subbalakshmi, A novel 3D scalable video compression algorithm, *IS&T/SPIE Electronic Imaging, Image and Video Communications and Processing*, 2003, vol. 5022, pp. 966-972.

Tillier, C., and B. Pesquet-Popescu, Scalable video compression and temporal lifting using 5/3 filters, *Proceedings of Picture Coding Symposiums*, PCS'03, Saint Malo, Apr. 23-25, 2003.

Weigand, T., G. J. Sullivan, G. Bjontegaard, A. Luthra, Overview of the H.264/AVC video coding standard, *IEEE Trans. on Circuits and Systems for Video Tech.*, Jul. 2003, vol. 13, No. 7, pp. 560-576.

Yan, R., F. Wu, S. Li, R. Tao and Y. Wang, Efficient video coding with hybrid spatial and fine-grain SNR scalabilities, *Visual Communications and Image Processing*, 2002, vol. 4671, pp. 850-859.

\* cited by examiner

PRIOR ART

PRIOR ART

THE ORIGINAL IMAGE

LL

LH

HL

HH

16x16

8x8

4x4

SYSTEM AND METHOD FOR IMAGE CODING EMPLOYING A HYBRID DIRECTIONAL PREDICTION AND WAVELET LIFTING

BACKGROUND

1. Technical Field

This invention is directed toward a system and method for encoding and decoding image data. More specifically, the invention is directed toward an improved coding and decoding method that exploits spatial correlations within an image by use of hybrid directional prediction and lifting wavelet techniques. The coding method may also be used to code intra frames of video sequences.

2. Background Art

Image compression is playing an important role in modern life with the rapid increase in the numbers of digital camera. Many compression schemes have been developed in past decades. These include early Differential Pulse Code Modulation (DPCM)-based [1], Discrete Cosine Transform (DCT)-based compression schemes [1]-[4] and wavelet-based [5]-[20] compression techniques. The DCT-based schemes, like JPEG [1], usually offer a low computational solution, but they have difficulty in achieving desired scalabilities.

In comparison to the DCT-based compression schemes, the wavelet-based schemes typically require more computational power. On the other hand, the wavelet transform [21] provides a multi-scale representation of images in the space-frequency domain. Aside from the energy compaction and de-correlation properties that facilitate compression, a major advantage of the wavelet transform is its inherent scalability. For example, the wavelet-based JPEG2000 standard [7] not only presents superior compression performance over the DCT-based JPEG standard, but also offers scalabilities in rate, quality and resolution that are very desirable for consumer and network applications.

As a matter of fact, natural images often contain richly directional attributes, which can be commonly approximated as linear edges on a local level. These edges may be neither vertical nor horizontal. However, most mainstream image coding schemes do not take such a fact into account [1], [5]-[7]. Two dimensional (2D) DCT or wavelet transforms are always performed in the horizontal and vertical directions. This results in large magnitudes in the high-frequency coefficients. In addition, at low bit-rates, the quantized effects can be observed clearly at image edges as the notorious Gibbs artifacts. This problem has been realized by many researchers [3], [4], [8]-[20]. Feig et al. introduced spatial prediction into a JPEG-wise code in a manner similar to the fractal-based image compression [3]. It does not outperform the pure DCT-based one in terms of PSNR/bit-rate trade-off. However, at very low bit-rates, it results in far fewer block artifacts and markedly better visual quality. Kondo et al. performed the directional prediction on DCT block, which can be predicted from one of four coded neighboring DCT blocks [4]. The new video coding standard H.264 has also successfully applied the block-based spatial prediction technique into the intra frame coding. It has shown significant gain on coding efficiency over that without spatial prediction [22].

There are many people who have investigated this problem in the wavelet/sub-band coding schemes. Ikonomopoulos et al. proposed a fixed set of directional filters to adapt to texture correlation at different directions [8]. Li et al. incorporated subband decomposition into the Ikonomopoulos' scheme [9]. Bamberger et al. used a filter bank based on a rectangular image sampling [10]-[12]. It can resolve images into many different directional components. Ridgelet and Curvelet recently developed by Candes et al. are another kind of transform with the polar sampling [13][14]. Mahesh et al. decomposed hexagonally sampled images into sub-bands that are selective in both frequency and orientation [15]. Taubman et al. proposed a scheme, where the input image is first re-sampled before the wavelet transfrom [16]. The re-sampling process can rotate image edges to the horizontal or vertical direction. Wang et al. used the similar idea from Taubman et al., but further proposed the overlapped extension to prevent coding artifacts around the boundaries of different direction regions [17]. Similar works on wavelet packet have been also reported in [18][19].

Few authors, however, have proposed to utilize the directional prediction into the lifting-based wavelet transform. The wavelet transform can be implemented with two ways: convolution based and lifting based. A lifting implementation was proposed by Daubechies. The lifting structure developed by Daubechies et al. is an efficient and popular implementation of the wavelet transform, where every Finite Impulse Response (FIR) wavelet filter can be factored into several lifting stages [23]. The convolution implementation of the wavelet transform allows spatial prediction to be integrated with great difficulty, while the wavelet technique potentially allows for the incorporation of spatial prediction. However, the technique proposed by Daubechies does not use any spatially directional information. Boulgouris et al. proposed an adaptive lifting technique to minimize the predicted error variance [20]. Similar to the idea from Ikonomopoulos, it derives several directional filters from the quincunx sampling and selects one of them with a median operation. But, it does not show significant gain in lossless image coding.

Therefore, what is needed is a system and method for encoding or decoding image data, such as, for example, video data, wherein the bit stream can be encoded using a method that takes advantage of spatial correlations within an image and that does not result in large coefficients in high frequency coefficients. This system and method should also be computationally efficient.

It is noted that in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The invention is directed toward a system and method for a codec that encodes and/or decodes image data. In the system and method of the invention directionally spatial prediction is incorporated into conventional lifting-based wavelet transforms. The system and method of the invention provides a novel, efficient and flexible Digital Signal Processing (DSP)-lifting technique. The DSP-lifting of the system and method of the present invention can use popular Haar, 5/3 and 9/7 filters, but has several properties that are not present in other lifting schemes. For example, in each lifting stage, the predicting or updating signals do not always come from horizontal or vertical samples as they typically do in other lifting schemes. The predicting and updating signals can be selected along image linear edges so as to reduce the magnitude of high-pass coefficients. Additionally, for the purpose of accurate spatial prediction, the predicting or updating signals may come from fractional samples, which can be calculated with any interpolation approach. That is, the DSP-lifting technique of the present invention has no constraint on the interpolation approach. Furthermore, in order to guarantee perfect reconstruction, the predicted and updated samples are expressed as integers. Also, when a 2D transform is separated as two 1D transforms, the two 1D transforms are not necessarily vertical in the DSP-lifting. However, the split is performed at the horizontal and vertical directions so as to generate four rectangular sub-bands.

One embodiment of the encoding system of the invention works as follows. A two dimensional (2D) signal is input into the system. This 2D signal is then transformed using directional prediction and lifting wavelets. More specifically, the transformation of the 2D signal using directional prediction and lifting wavelets involves performing a 1D wavelet transform in the vertical direction and performing a 1D wavelet transform in the horizontal direction. Each 1D vertical and horizontal wavelet transform is then split into even and odd polyphase samples. The odd polyphase samples are predicted from neighboring even polyphase samples by using predicting signals that are selected along edges in the image. The even polyphase samples are then updated using the predicted odd polyphase samples (also called the predicted residue) and the coefficients of the predicted odd polyphase samples (e.g. residue) and updated even polyphase samples are output and entropy encoded. The entropy encoded coefficients can then be output to the bit stream.

The system and method of the invention also employs techniques to efficiently estimate and code directional data, thus increasing the precision of spatial prediction and reducing the overhead bits. This is a key point to achieve the high performance in the DSP-lifting scheme of the invention. The encoding/decoding scheme in one embodiment of the invention is implemented in a JPEG2000-wise codec, where the DSP-lifting takes the place of the conventional lifting.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the invention will become better understood with regard to the following description, appended claims, and accompanying drawings where:

FIG. 5 is an exemplified image and the resultant four sub-bands with the conventional lifting decomposition.

FIG. 8A represents the low low (LL) sub-band. FIG. 8B represents the low high (LH) sub-band. FIG. 8C represents the high low (HL) sub-band and FIG. 8D represents the high high (HH) sub-band.

FIG. 9A is a 16×16 pixel block partition; FIG. 9B is an 8×8 pixel block partition. FIG. 9C is a 4×4 pixel block partition.

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
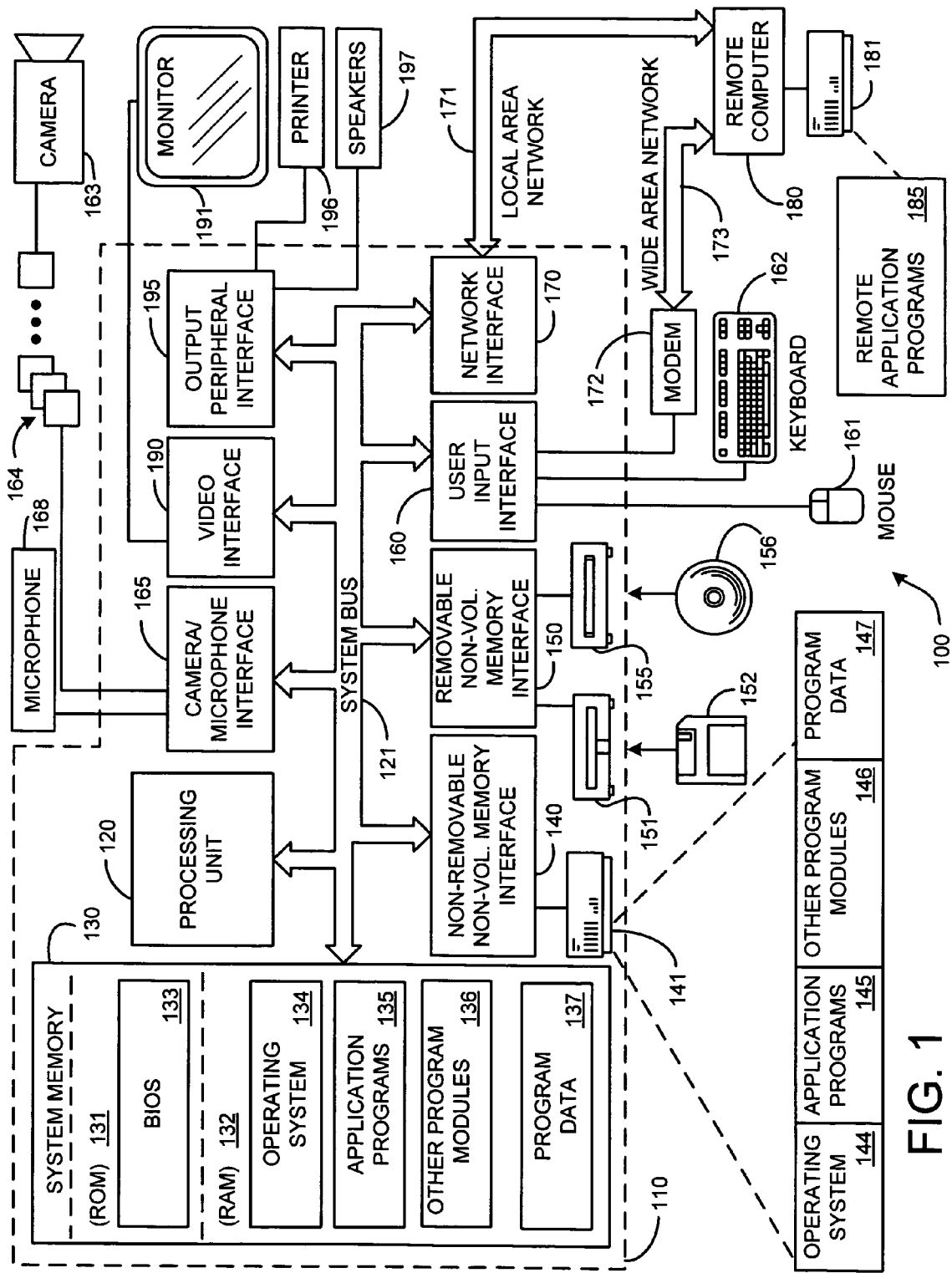
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 A System and Method for Image Coding Employing Hybrid Directional Prediction and Lifting Wavelet.

The image coding system and method of the invention is discussed in more detail in the following paragraphs. An invention overview is provided along with an overview of conventional lifting techniques. The directional prediction and lifting techniques of the present invention are then contrasted and detailed with respect to conventional lifting. Interpolation methods, prediction angle estimation and encoding are also discussed. Finally, exemplary working embodiments of the invention are also discussed.

2.1 Invention Overview

Figure 2:
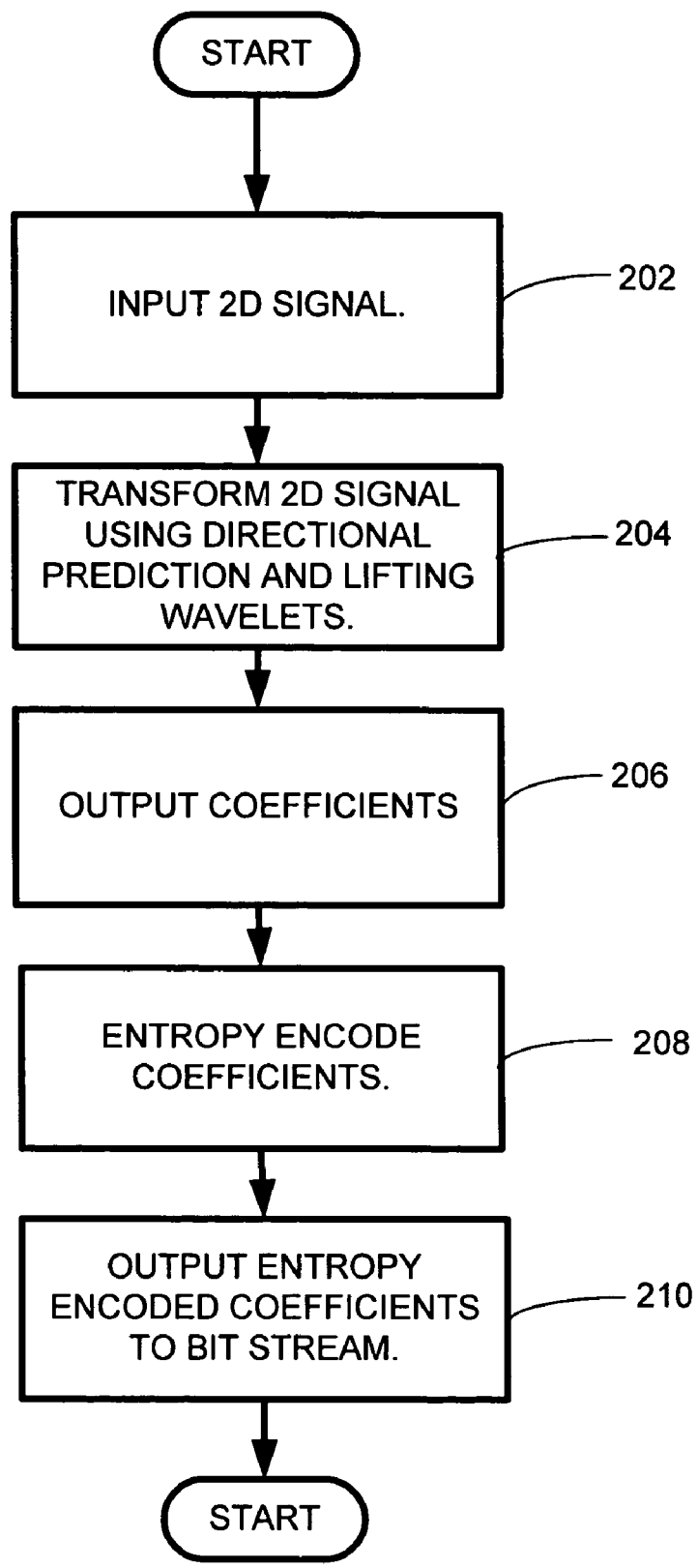
FIG. 2 is an overview flow diagram of the encoding method of the invention.

An overview of the system and method of the invention is shown in FIG. 2. As shown in process action 202, a two dimensional (2D) signal representing an image is input into the system. This 2D signal is then transformed using directional prediction based on edges in the image and lifting wavelets, as shown in process action 204 and detailed in FIG. 3. The coefficients of the transform are then output (process action 206) and entropy encoded (process action 208). The entropy encoded coefficients are then output to a bit stream as shown in process action 210.

Figure 3:
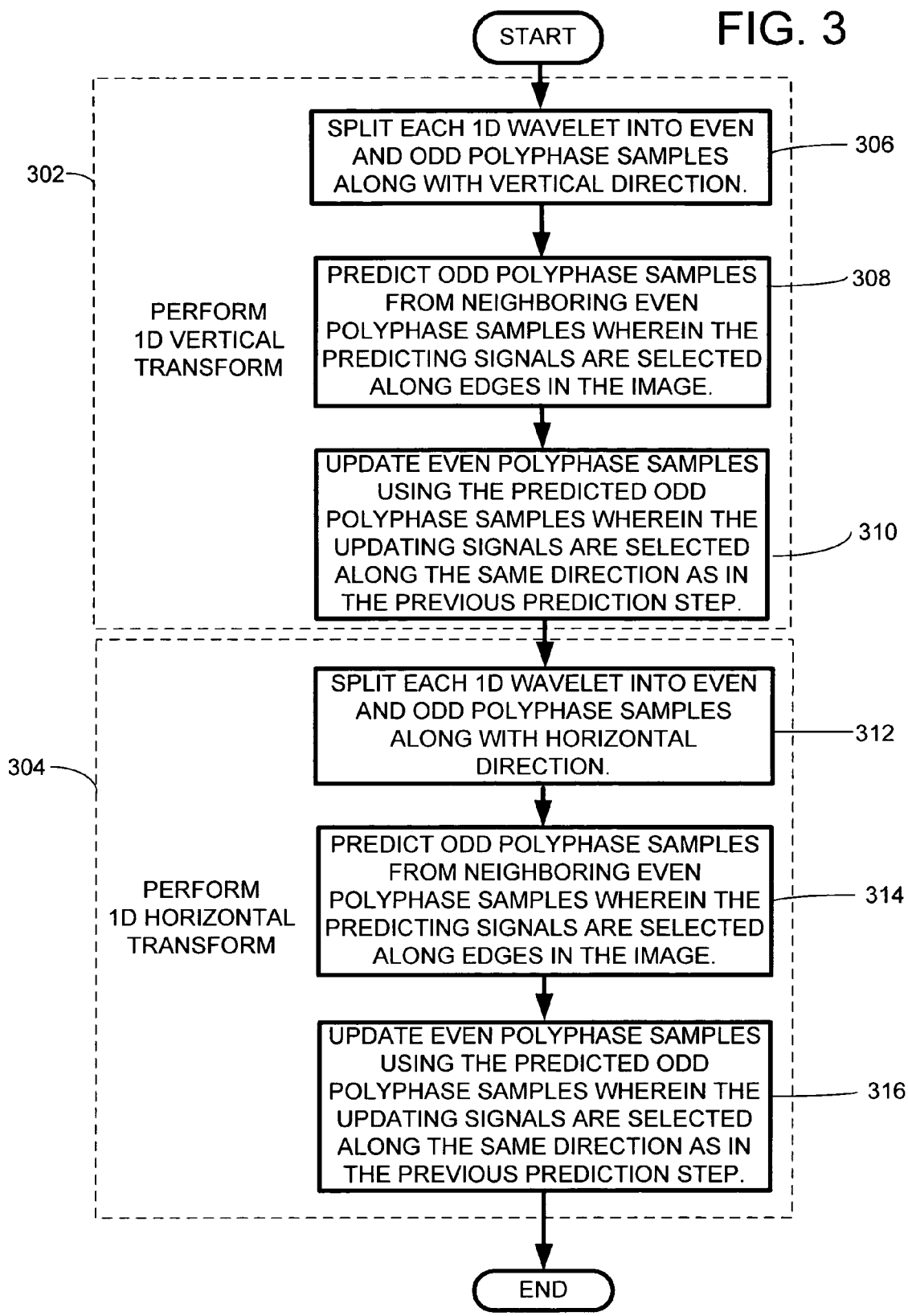
FIG. 3 is an exemplary flow diagram of 2D directional spatial prediction lifting.

As shown in FIG. 3, the transformation of the 2D signal using directional prediction and lifting wavelets involves performing a 1D wavelet transform in the vertical direction (process action 302) and performing a 1D wavelet transform in the horizontal direction (process action 304). It should be noted that these two process actions can be reversed in order.

The specifics of process actions 302 and 304 are as follows. As shown in process action 306, the first 1D wavelet transform is split into even and odd polyphase samples along the vertical direction (process action 306). The 'predicted residue' or odd polyphase samples are predicted from neighboring even polyphase samples by using predicting signals that are selected along edges in the image (process action 308). The even polyphase samples are then updated using the predicted odd polyphase samples wherein the updating signals are selected along the same direction as the previous prediction step (process action 310).

Similarly, the second 1D wavelet transform is split into even and odd polyphase samples along the horizontal direction (process action 312). The 'predicted residue' or odd polyphase samples are predicted from neighboring even polyphase samples by using predicting signals that are selected along edges in the image (process action 314). The even polyphase samples are then updated using the predicted odd polyphase samples wherein the updating signals are selected along the same direction as the previous prediction step (process action 316). The coefficients of the 'predicted residue' and the updated even polyphase samples are then output as shown in FIG. 2.

The system and method of the invention incorporates directionally spatial prediction into conventional lifting-based wavelet transforms to provide for an efficient and flexible DSP-lifting image encoding technique. In some embodiments of the invention, popular Haar, 5/3 and 9/7 filters are used. However, the system and method of the invention has the following features that have not previously employed in other lifting schemes.

In each lifting stage, the predicting or updating signals do not always come from horizontal or vertical samples. They can be selected along image linear edges so as to reduce the magnitude of high-pass coefficients.

For the purpose of the accurate spatial prediction, the predicting or updating signals may come from the fractional samples, which can be calculated with existing interpolation techniques. The lifting method of the present invention has no constraint on the interpolation approach.

In order to guarantee the perfect reconstruction, the predicted and updated samples are always in integer positions.

When a 2D transform is separated as two 1D transforms, the two 1D transforms are not necessarily vertical in the DSP-lifting of the invention. For example, in conventional lifting, two 1D transforms are always performed at horizontal and vertical directions. The default is that the second 1D transform is vertical to the first. But, in many cases, if the first 1D transform is performed along with a certain direction, the vertical direction in the second 1D transform may be not the best prediction. In the system and method according to the invention the second transform can freely select the best prediction direction and is not constrained by the direction of the first 1D transform. But the split of the samples into the odd and even polyphase samples is performed at the horizontal and vertical directions so as to generate four rectangular sub-bands.

In addition, the system and method of the invention also employs techniques to efficiently estimate and code the directional data, thus increasing the precision of spatial prediction and reducing the overhead bits. This is a key point to achieve the high performance in the DSP-lifting scheme of the invention. One embodiment of the invention is implemented in a JPEG2000-wise codec, where the DSP-lifting takes the place of the conventional lifting.

In order to fully understand the differences between the present invention and conventional lifting techniques, an overview of conventional lifting is described and contrasted in the sections below.

2.2 Overview of Conventional Lifting.

Conventional lifting as proposed by Daubechies et al. in [23] shall now be reviewed as a starting point to discuss the system and method according to the invention. A special image is used to clearly illustrate the existing problem in the prior wavelet/sub-band image coding schemes. The basic idea of wavelet transforms is to exploit the correlation structure present in most real life signals to build a sparse approximation. Neighboring samples and frequencies are more correlated than ones far apart.

Let $x(m,n)_{m,n \in Z}$ be a 2D signal. Without loss of generality, it is assumed that this signal is first operated on with a 1D wavelet transform in the vertical direction (e.g. vertical wavelet decomposition is performed on each row in the image) and then in the horizontal direction (e.g. horizontal wavelet decomposition is performed on each column in the image). Per the technique given in [23], each 1D wavelet transform can be factored into one or multiple lifting stages. Lifting can be viewed as a method to analyze and synthesize a given signal using spatial domain techniques. In general, a typical lifting stage consists of three stages: split, predict and update. In the splitting stage, the input signal is divided into two disjoint sets the odd and even samples. In the predicting stage, the even samples are used to predict the odd coefficients. This predicted value is subtracted from the odd coefficients to give the error in the predictions. In the updating step, the even coefficients are combined with the error in the predictions which are passed through an update function to provide the update to the even coefficients. The lifting steps are easily inverted. That is, it is possible to reconstruct the original signal from the coefficients of the error predictions and the update of the even coefficients.

More specifically, the lifting stages are described in more detail below with respect to the vertical 1D wavelet transform.

First, all samples of the 1D vertical wavelet transform are split into two parts:

even polyphase samples and odd polyphase samples, $$\begin{cases} x_e(m, n) = x(m, 2n) \\ x_o(m, n) = x(m, 2n + 1) \end{cases} \quad (1)$$

In the predicting step, the odd polyphase samples are predicted from the neighboring even polyphase samples. The predicted residue h(m,n) is calculated with the following equation, $$h(m,n) = x_o(m,n) - P_{x_e}(m,n). \quad (2)$$

Since the vertical transform is being discussed now, the prediction of each $x_o(m,n)$ is a linear combination of neighboring even coefficients in the mth column, $$P_{x_e}(m, n) = \sum_i p_i x_e(m, n + i). \quad (3)$$

It is worth noticing that $p_i$ is independent of the variable m in the conventional lifting. Therefore, the impulse response function of Equation (3) can be simplified as 1D form, i.e.

$$P(z) = \sum_{i=i_b}^{i_e} p_i z^i. \quad (4)$$

where z is the variable in Z domain and $p_i$ is the predicting parameter, which is decided by wavelet filter. In general, the FIR wavelet filter is considered in case only a finite number of coefficients $p_i$ are non-zero. Here let $i_b$ and $i_e$ be the smallest and largest integer number i, respectively, where $p_i$ is non-zero. After the calculation of Equation (2), a new representation of x(m,n) is obtained by replacing $x_o(m,n)$ with the predicted residue h(m,n). It is equivalent to x(m,n). Given the prediction of the odd polyphase samples and the predicted residue, one can perfectly reconstruct the original odd polyphase samples with Equation (2).

In the updating step, the even polyphase samples are replaced with $$l(m,n) = x_e(m,n) + U_h(m,n). \quad (5)$$

Here $U_h(m,n)$ is a linear combination of neighboring predicted residue in the mth column, $$U_h(m, n) = \sum_j u_j h(m, n + j). \quad (6)$$

Similarly, the finite impulse response function of Equation (6) is given as follows, $$U(z) = \sum_{j=j_b}^{j_e} u_j z^j. \quad (7)$$

Here $j_b$ and $j_e$ be the smallest and largest integer number j, respectively, where $u_j$ is non-zero. $u_j$ is the updating parameter, which is decided by wavelet filter. This step is trivially invertible again. Given l(m,n) and h(m,n), one can perfectly reconstruct the even polyphase samples.

Figure 4:
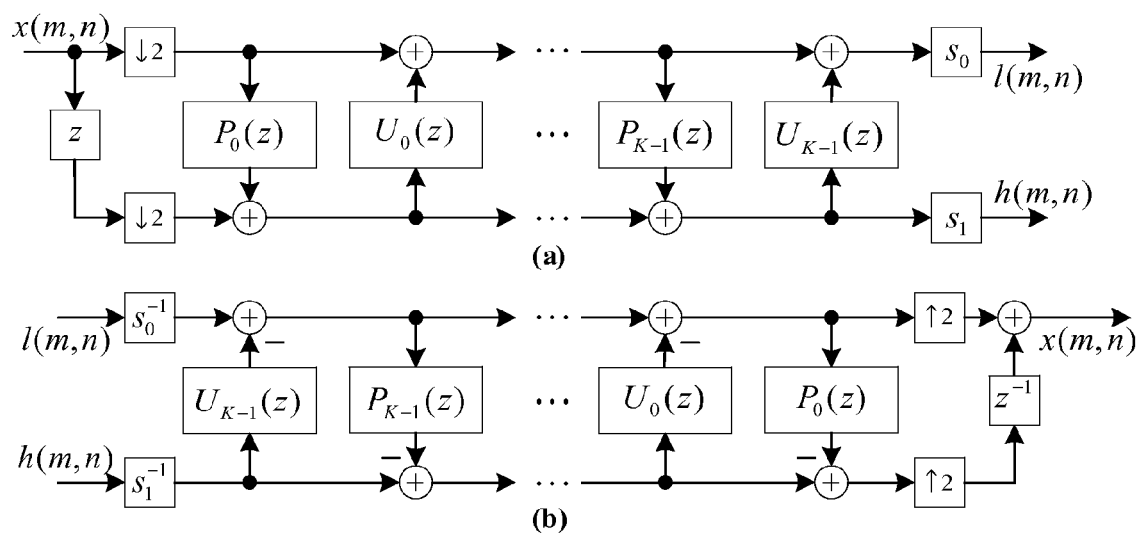
FIG. 4 is a simplified block diagram of a generic 1D conventional lifting transform, (a) analysis side and (b) synthesis side.

The variables $p_i$ and $u_j$ are the filtering parameters. The number of non-zero filtering parameters and their magnitudes usually vary with the wavelet filter used. However, the 1D lifting-based transform with different filters can be commonly described by the framework as shown in FIG. 4. FIG. 4(a) is the forward lifting-based transform. FIG. 4(b) is the inverse lifting-based transform. The variable K is the number of lifting stages (K=1 for the Haar and for 5/3 filters and K=2 for the 9/7 filter). A filter is a linear time invariant operator and is completely determine by its impulse response. A Finite Impulse Response filter (FIR) is a case where only a finite number of the filter coefficients are non-zero. For the convenience of comparing the DSP-lifting technique of the present invention with conventional lifting, the FIR functions of the Haar, 5/3 and 9/7 filters are listed as follows, $$Haar: \begin{cases} P_0(z) = -1 \\ U_0(z) = 1/2 \\ s_0 = s_1 = 1 \end{cases} \quad (8)$$

$$5/3: \begin{cases} P_0(z) = -(1+z)/2 \\ U_0(z) = (1+z^{-1})/4 \\ s_0 = s_1 = 1 \end{cases} \quad (9)$$

$$9/7: \begin{cases} P_0(z) = -1.586134 \times (1+z) \\ U_0(z) = -0.05298 \times (1+z^{-1}) \\ P_1(z) = 0.882911 \times (1+z) \\ U_1(z) = 0.443506 \times (1+z^{-1}) \\ s_0 = 1.230174 \\ s_1 = 1/s_0 \end{cases} \quad (10)$$

The 1D horizontal lifting transform is performed in the same manner as discussed above with respect to the vertical lifting transform, but it operates on the dimension m. From the above discussion, one can find the predictions of Equation (3) and (6) are always the combination of neighboring integer samples or high-pass coefficients at the horizontal or vertical direction. When the coded image has many edges that are neither horizontal nor vertical, the problem discussed below arises.

Figure 5A:
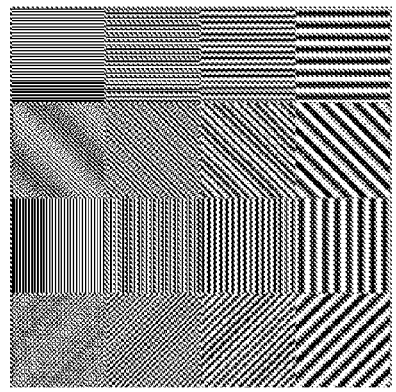
FIG. 5A represents the original image.
Figure 5B:
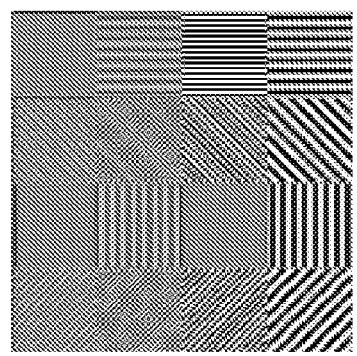
FIG. 5B represents the low low (LL) sub-band.
Figure 5C:
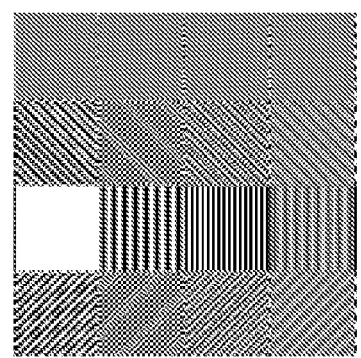
FIG. 5C represents the low high (LH) sub-band.
Figure 5D:
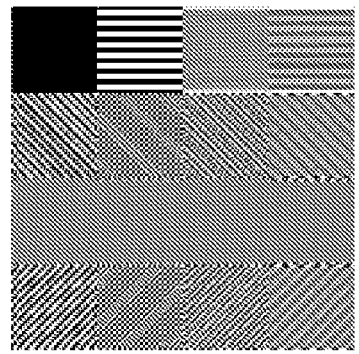
FIG. 5D represents the high low (HL) sub-band and FIG. 5E represents the high high (HH) sub-band.
Figure 5E:
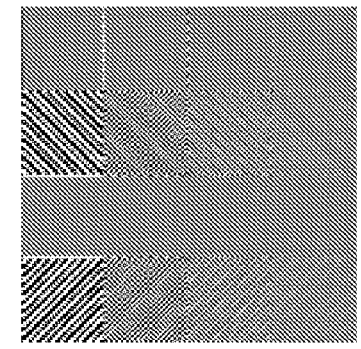

To clearly explain the problem, a special image is used, as shown in FIG. 5(a), for a 2D wavelet transform. It consists of four-row blocks: four square blocks with horizontal stripes in the first row, four square blocks with tilted stripes in the second and forth rows, and four square block with vertical stripes in the third rows. After a conventional 2D lifting transform, four sub-band results which are depicted in FIG. 5 (b), (c), (d) and (e). These sub-bands are acquired by passing the 2D wavelet through both low pass and high pass filters. Initially, the 2D wavelet is operated on by a vertical 1D transform which results in an image defined by low pass coefficients and an image defined by high pass coefficients. Then the 2D wavelet is operated on by a horizontal 1D transform which results in an image defined by low pass coefficients and high pass coefficients. These four images are then combined into the four depicted sub-bands. In the low high (LH) sub-band, only the first row is completely removed by the horizontal transform. In the high low (HL) sub-band, only the third row is completely removed by the vertical transform. In the high high (HH) sub-band, the rows with tilted stripes still remained after both horizontal and vertical transforms. One can clearly observe that those high-pass sub-bands contain much texture information. This will result in low coding efficiency and poor visual quality at low bit-rates.

2.3 Lifting structure of the System and Method of Image Coding Employing Hybrid Directional Prediction and Lifting Wavelets of the Invention.

Figure 6:
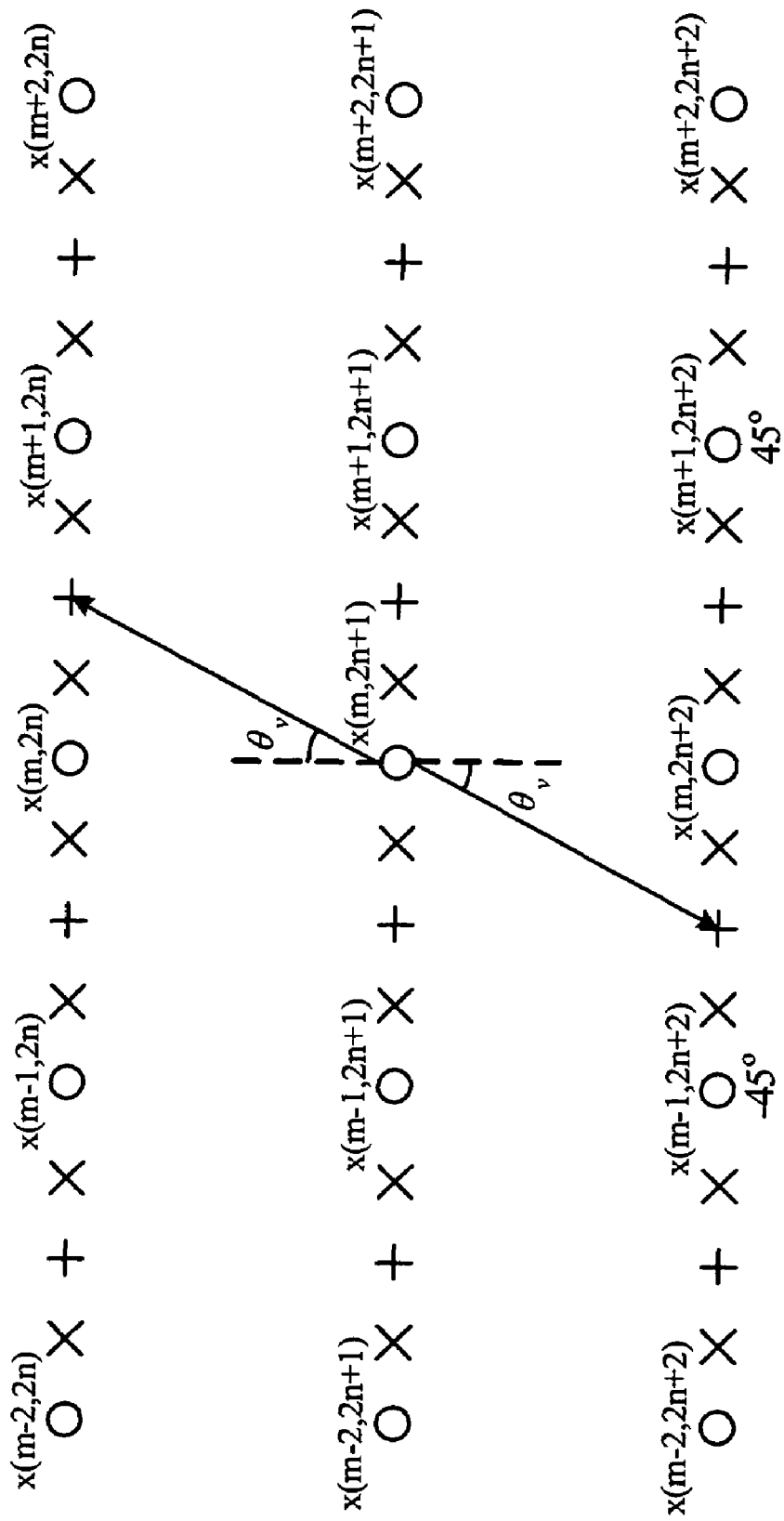
FIG. 6 depicts the angle of the vertical transform in the DSP-lifting scheme according to the system and method according to the invention.
Figure 7:
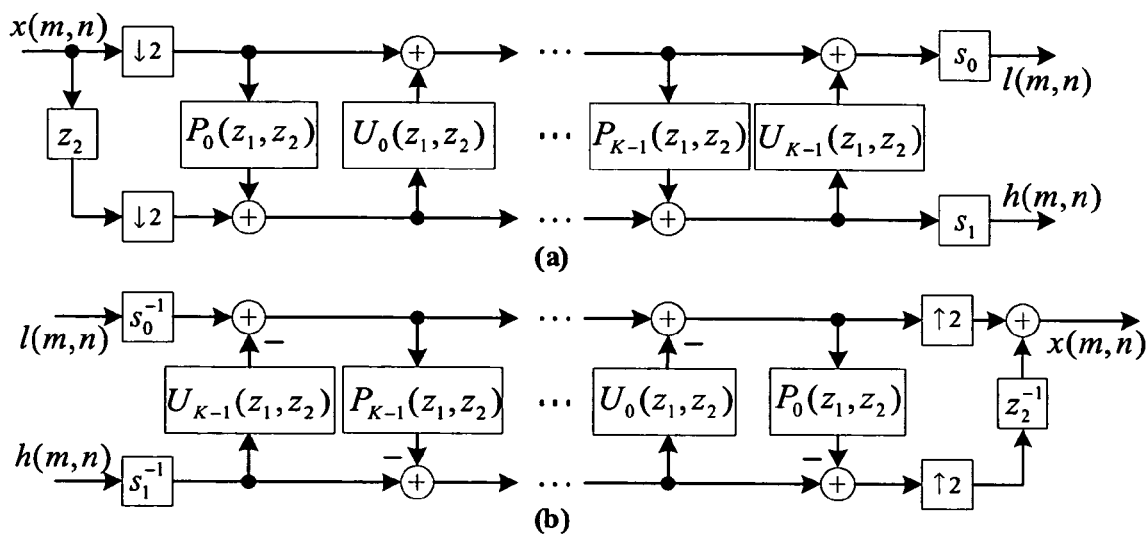
FIG. 7 depicts the generic 1D DSP-lifting transform, (a) analysis side and (b) synthesis side.
Figure 8A:
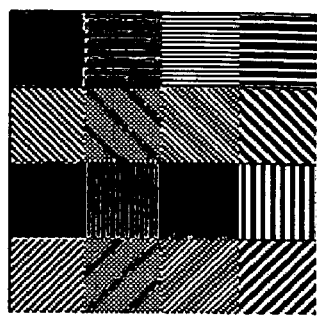
FIGS. 8A through 8D depict the resultant four sub-bands with the DSP-lifting decomposition of the present invention.
Figure 8B:
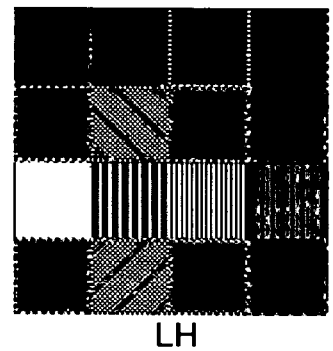
Figure 8C:
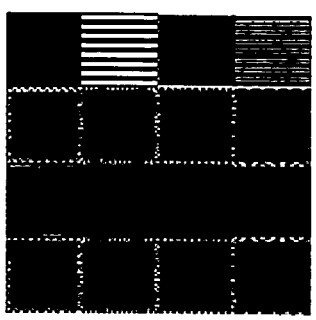
Figure 8D:
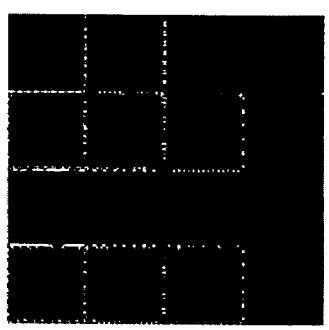

A fundamental difference between the conventional lifting and the DSP-lifting of the system and method according to the invention lays in Equations (3) and (7). Instead of always generating the predictions in the horizontal or vertical direction as is done in conventional lifting, the DSP-lifting technique of the invention utilizes local spatial correlation. As shown in FIG. 6, assume that the pixels have a strong correlation at the angle $\theta_v$, where the integer pixels are represented by the markers " ", the half pixels by the markers "×" and the quarter pixels by the markers "+". In the DSP-lifting system and method of the invention, the predictions of x(m,2n+1) come from the even polyphase samples pointed by the arrows in FIG. 6. These are calculated as follows, $$P_{x_e}(m, n) = \sum_i p_i x_e(m + \text{sign}(i-1) tg(\theta_v), n + i) \quad (11)$$

where tg( )=sin( )/cos( ).

The corresponding finite impulse response function is $$P(z_1, z_2) = \sum_{i=i_b}^{i_e} p_i z_1^{\text{sign}(i-1) tg(\theta_v)} z_2^i. \quad (12)$$

Since the prediction is always calculated from the even polyphase samples, if the directional angle is known, the DSP-lifting can perfectly reconstruct the odd polyphase samples with Equation (2).

In the updating step, the DSP-lifting technique of the invention uses the same directional angle as that in the predicting step to minimize the number of bits necessary to code the angle data. Therefore, the prediction of the even polyphase samples is given as $$U_h(m, n) = \sum_j u_j h(m + \text{sign}(j) tg(\theta_v), n + j). \quad (13)$$

The corresponding finite impulse response function is $$U(z_1, z_2) = \sum_{j=j_b}^{j_e} u_j z_1^{\text{sign}(j) tg(\theta_v)} z_2^j. \quad (14)$$

Obviously, it also guarantees the perfect reconstruction.

The DSP-lifting system and method of the invention can be employed with different wavelet filters which can be likewise described with a framework as shown in FIG. 6. The proposed FIR functions of the Haar, 5/3 and 9/7 filters are given as follows, $$\text{Haar:} \begin{cases} P_0(z_1, z_2) = -z_1^{-tg(\theta_v)} \\ U_0(z_1, z_2) = z_1^{tg(\theta_v)}/2 \\ s_0 = s_1 = 1 \end{cases} \quad (15)$$

$$5/3: \begin{cases} P_0(z_1, z_2) = -\left(z_1^{-tg(\theta_v)} + z_1^{tg(\theta_v)} z_2\right)/2 \\ U_0(z_1, z_2) = \left(z_1^{tg(\theta_v)} + z_1^{-tg(\theta_v)} z_2^{-1}\right)/4 \\ s_0 = s_1 = 1 \end{cases} \quad (16)$$

$$9/7: \begin{cases} P_0(z_1, z_2) = -1.586134 \times \left(z_1^{-tg(\theta_v)} + z_1^{tg(\theta_v)} z_2\right) \\ U_0(z_1, z_2) = -0.05298 \times \left(z_1^{tg(\theta_v)} + z_1^{-tg(\theta_v)} z_2^{-1}\right) \\ P_1(z_1, z_2) = 0.882911 \times \left(z_1^{-tg(\theta_v)} + z_1^{tg(\theta_v)} z_2\right) \\ U_1(z_1, z_2) = 0.443506 \times \left(z_1^{tg(\theta_v)} + z_1^{-tg(\theta_v)} z_2^{-1}\right) \\ s_0 = 1.230174 \\ s_1 = 1/s_0 \end{cases} \quad (17)$$

Compared with Equations (8), (9) and (10), conventional lifting can be viewed as a special case of the DSP-lifting of the invention, where $\theta_v$ is equal to zero. In particular, when a 1D wavelet transform is factored into more than a lifting stage (e.g. the 9/7 filter), except for the first lifting stage, the spatial prediction may be disabled in the other stages by setting $\theta_v$ as zero because the previous lifting stage has removed the directional correlations.

The above discussion has related to the 1D vertical transform in the DSP-lifting of the invention. The horizontal transform is performed with the similar way in the dimension m. It is worth noticing that the directional angle $\theta_h$ of horizontal transform is not required to be vertical to $\theta_v$ so that the horizontal transform can find the best direction for the decomposition.

FIG. 8 depicts the results after the DSP-lifting decomposition of the present invention. In the HL sub-band, only the row with horizontal stripes remains after the vertical transform. There is not any row remaining in the HH sub-band after the vertical and horizontal transforms. Since the downsampling process after the vertical transform, the DSP-lifting technique of the invention cannot find the accurate predicted direction. But even in this case, the energy of the LH sub-band is far less than that of the conventional lifting decomposition.

2.4 Interpolation.

For the purpose of the accurate spatial prediction, the DSP-lifting of the invention allows the directional angle to point to fractional pixels. In other words, tg(θ) used in Equations (12) and (13) may be not an integer. Therefore, an interpolation technique is needed in this case.

As shown in FIG. 6, the prediction of x(m, 2n+1) uses the half pixels between x(m−1,2n+2) and x(m, 2n+2) and between x(m, 2n) and x(m+1, 2n). In general, the values of those half pixels are not available. The interpolation is the method to calculate the value of the fractional pixel. There are many methods, for example, the line one is $$y=(x(m-1, 2n+2)+x(m,2n+2)+1)>>1.$$

The interpolation technique is discussed by using Equation (12) as an example. First, for the perfect reconstruction, the integer pixels that are used to interpolate the fractional pixel should belong to $x_e(m,n)$. The technique cannot use any integer pixel from $x_o(m,n)$. The interpolation can be generally described as $$x_e(m + \text{sign}(i-1)tg(\theta), n+i) = \sum_k a_k x_e(m+k, n+i). \quad (18)$$

Here k is the integer around sign(i−1)tg(θ) and $\alpha_k$ is the parameter of interpolation filter. After the z-transform of Equation (18), one gets $$z_1^{\text{sign}(i-1)tg(\theta_v)} = \sum_{k=k_b}^{k_e} a_k z_1^k \quad (19)$$

The parameter $\alpha_k$ has a finite number of non-zero coefficients. In this embodiment, the popular Sinc interpolation is adopted, which decides the value $\alpha_k$. The interpolation of Equation (14) is performed in the same manner.

2.5 Direction Estimation.

Figure 9A:
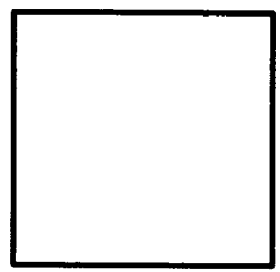
FIGS. 9A, 9B and 9C depict three partition modes for estimating directional angles of the system and method according to the invention.
Figure 9B:
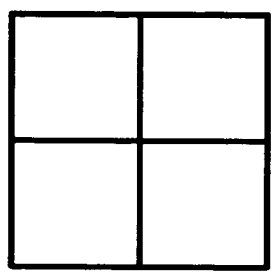
Figure 9C:
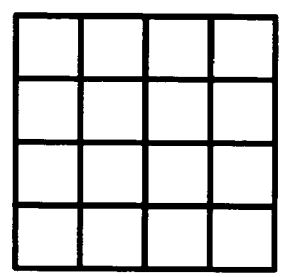

The directional angles $\theta_v$ and $\theta_h$ of each sample are estimated locally at a given block size, for example a 16×16 block. As shown FIG. 8, a 16×16 block can be partitioned into three modes: 16×16 (FIG. 9A), 8×8 (FIG. 9B) and 4×4 (FIG. 9C). In the 16×16 mode, all pixels have the same directional angle. In the 4×4 mode, each block has 16 directional angles and all pixels in a 4×4 sub-block share the same angles. In addition, the finer of the predicted angle, the more accurate the spatial prediction is. From the knowledge of motion compensation in video coding, this embodiment of the invention prefers the predicted precision up to the quarter pixel.

Figure 10:
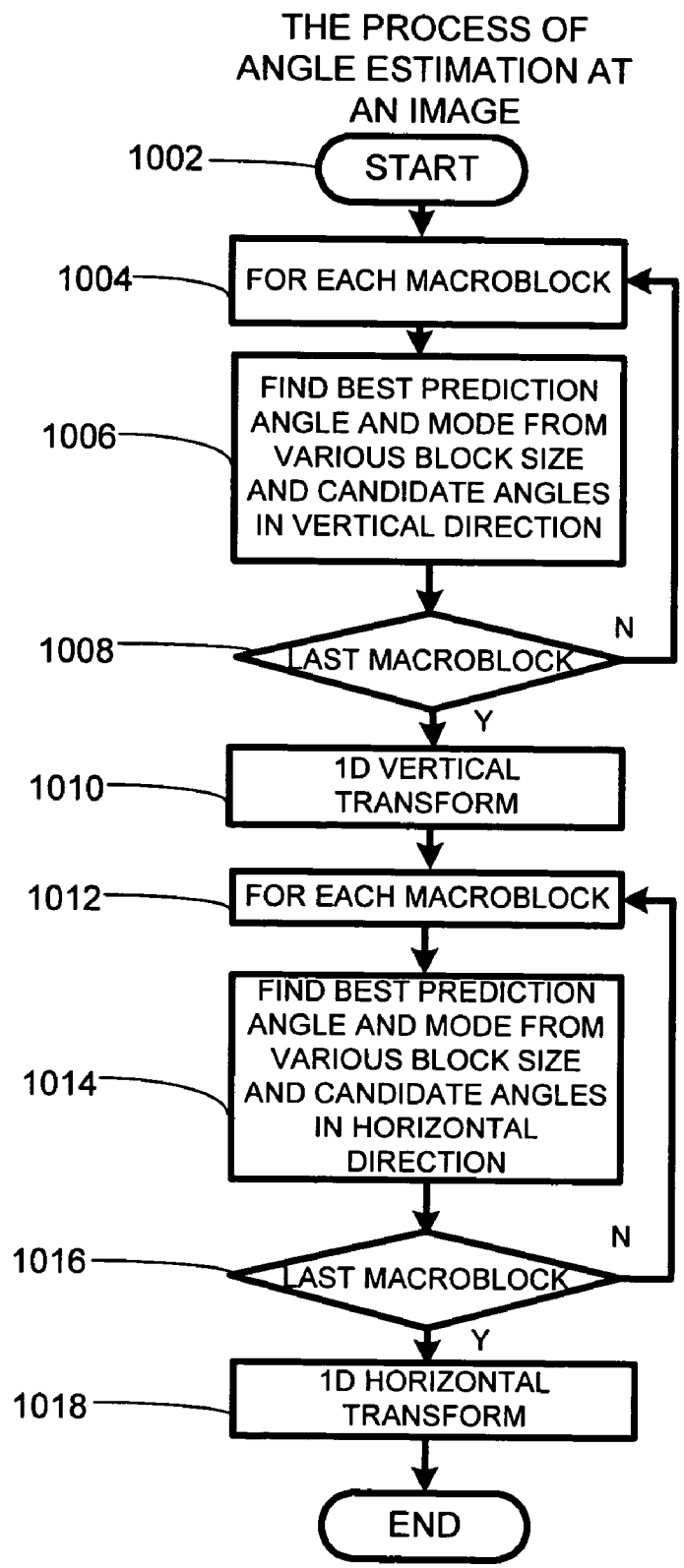
FIG. 10 depicts a flow diagram for the process of angle estimation in an image of the system and method according to the invention.

In general, the process of angle estimation in an image is shown in FIG. 10. As shown in process actions 1002, 1004 and 1006, for each macroblock in the image the best prediction angle and mode is found from the various block sizes and candidate angles in the vertical direction. The 1D vertical transform is then performed (process action 908). As shown in process actions 1010, 1012 and 1014, for each macroblock in the image the best prediction angle and mode is found from the various block sizes and candidate angles in the horizontal direction. The 1D vertical transform is then performed, as shown in process action 1016.

Figure 11:
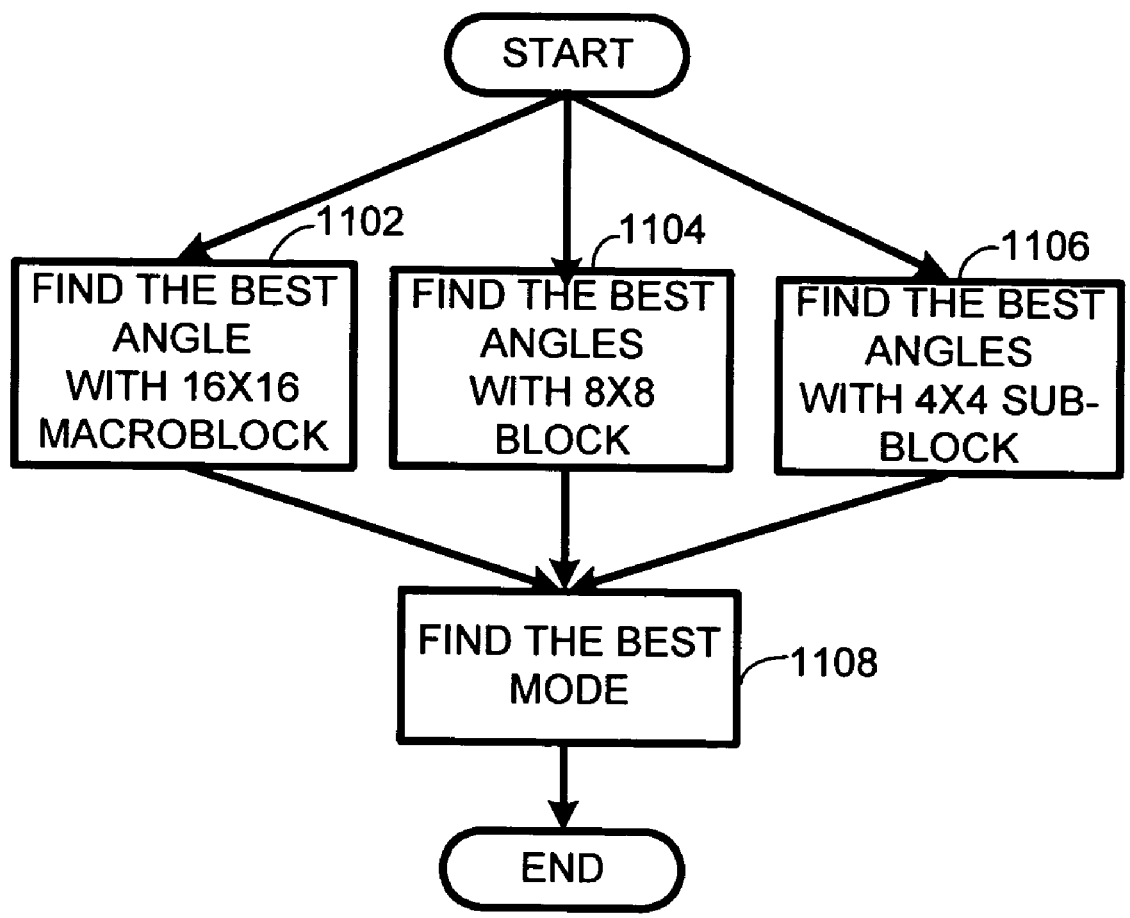
FIG. 11 depicts a flow diagram for angle and mode estimation at a macroblock of the system and method according to the invention.

FIG. 11 depicts the process of angle and mode estimation at the macroblock. As shown in process actions 1102, 1104, 1106, the best angle at the 16×16 macroblock, the best angle at the 8×8 macroblock and the best angle at the 4×4 sub-block are found. Then the best mode is found based on these three best angles at the block mode level (process action 1108). The criterion for determining the best angle and mode are give in equations (20) and (21) for the vertical and horizontal transforms.

The R-D algorithm is proposed to decide the predicted mode and directional angles of each 16×16 block. In the vertical lifting transform, the criterion to estimate the mode and directional angles is given as follows, $$E = \sum_{m=m_0}^{m_0+16} \sum_{n=n_0}^{n_0+8} |h(m,n)| + \lambda_v R_v. \quad (20)$$

Here, h(m,n) are the high-pass coefficients after the vertical transform, which can be calculated with Equation (2). $R_v$ are the bits to code the mode and directional angles; $\lambda_v$ is the Lagrangian factor; and $(m_o,n_o)$ are the coordinates of the left-upper pixel of h(m,n).

After the vertical lifting transform with the estimated directional data, one can get the low-pass signal l(m,n) and high-pass signal h(m,n). They are continuously processed with the horizontal transform. In general, h(m,n) has less energy. It is not worth it to use another set of predicted modes and angles to horizontally transform the high-pass sub-band after the vertical decomposition. Therefore, h(m,n) is decomposed at the horizontal direction.

There is another set of predicted modes and angles to decompose l(m,n), that may be different from that used in the vertical decomposition. The new criterion is given as follows, $$E = \sum_{m=m_1}^{m_1+8} \sum_{n=n_1}^{n_1+8} |lh(m,n)| + \lambda_h R_h. \quad (21)$$

Here, lh(m,n) is the coefficient of the LH sub-band. $R_h$ are the bits to code the mode and directional angles. $\lambda_h$ is the Lagrangian factor. $(m_1,n_1)$ are the coordinates of the left-upper pixel of lh(m,n).

2.6 Directional Angle Coding.

Figure 12:
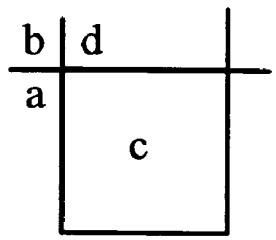
FIG. 12 depicts the prediction of directional angle of the system and method according to the invention.

The directional angles are coded with a fixed variable length coding (VLC) table but with adaptive mapping. As shown in FIG. 12, assume that the angle c of the current block is coded. The angles a, b and d of neighboring blocks are ready to predict the coded angle. One uses the following criterion to select which angle is used as prediction, $$p = \begin{cases} d & \text{abs}(b-d) > \text{abs}(b-a) \\ a & \text{abs}(b-d) \leq \text{abs}(b-a) \end{cases}. \quad (22)$$

In other words, if the angles b and d have a larger difference, the angle a is used as prediction; otherwise the angle d is used as prediction.

The symbols of VLC table are assigned adaptively according to the predicted angle. The predicted angle is given as the shortest symbol, and other angles are assigned from short symbol to long one according the absolute difference between these angles and the predicted angle. After that, the current angle c is coded with the pre-determined table.

2.7 Exemplary Applications of the System and Method According to the Present Invention.

Besides image coding, the proposed DSP-lifting can also be applied into many other areas. Now, two exemplary applications of the system and method of the invention are discussed: spatial scalable video coding and low-delay wavelet video coding.

2.7.1 Spatial Scalable Video Coding

Spatial scalability is a much desired feature in the video coding especially with increasing wireless networks and portable devices. It is a hard nut to crack. Many researches have shown that the spatial scalability will considerably hurt the coding efficiency. One of solutions to achieve spatial scalability is to first decompose the video sequences into several four low-resolution sequences and then code them either jointly or separately. However, the high-pass sequences of these sequences are difficult to compress with existing motion compensated schemes. With the help of the DSP-lifting technique of the present invention, the high-pass sequences have much less energy because the correlation among pixels is removed greatly with the directionally spatial transform. Each of the high-pass sequences are compressed with intra coding.

2.7.2 Low-delay 3D Wavelet Video Coding.

MPEG has called for proposals on scalable video coding. Most of the proposed schemes utilize the temporal wavelet decomposition. A big problem in these schemes is that the delay is quite large because of multiple-layer temporal decomposition. It can not satisfy the requirements from low-delay and real-time applications. With the proposed DSP-lifting of the invention, the 3D wavelet video coding schemes can reduce the number of temporal decompositions. The correlations among the low-band frames can be removed by the directional spatial prediction.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] A. Habibi, R. S. Hershel, "A unified representation of differential pulse-code modulation (DPCM) and transform coding systems," IEEE trans. on communications, vol. 22, no 5, 692-696, 1974.

[2] W. B. Pennebaker and J. L. Mitchell, "JPEG still image data compression standard," New York: Van Nostrand, 1993.

[3] E. Feig, H. Peterson, V. Ratnakar, Image compression using spatial prediction, ICASSP, vol. 4, 2339-2342, 1995.

[4] H. Kondo, Y. Oishi, Digital image compression using directional sub-block DCT, International Conference on Comm. Technology, vol. 1, 21-25, 2000.

[5] J. M. Shapiro, "Embedded image coding using zerotree of wavelet coefficients," IEEE trans. Signal Processing, vol. 41, no 12, 3445-3462, 1993

[6] A. Said and W. A. Pearlman, "A new fast and efficient image codec based on set partitioning in hierarchical trees," IEEE trans. on CSVT, vol. 6, no 3, 243-250, 1996.

[7] D. Taubman and M. Marcellin, "JPEG2000: Image Compression Fundamentals, Standards, and Practice," Kluwer Academic Publishers, 2001.

[8] A. Ikonomopoulos and M. Kunt, "High compression image coding via directional filtering," Signal Processing, vol. 8, no 2,179-203, 1985.

[9] H. Li and Z. He, "Directional sub-band coding of images," ICASSP, vol. 3, 1823-1826, 1989.

[10] R. H. Bamberger, M. Smith, "A filter bank for the directional decomposition of images: theory and design," IEEE trans. on Signal Processing, vol. 40, no 4, 882-893, 1992.

[11] R. H. Bamberger, M. Smith, "Narrow band analysis of a filter bank for the directional decomposition of images," ICASSP, vol. 3, 1739-1742, 1990.

[12] R. H. Bamberger, M. Smith, "A comparison of directionally-based and nondirectionally-based sub-band image coders," in Proc. SPIE, VCIP, 1605, vol. 2, 757-768, 1991.

[13] E. J. Candes, "Monoscale ridgelets for the representation of images with edges," Dept. Statistic, Stanford Univ., Tech. Reporter, 1999.

[14] E. J. Candes and D. L. Donoho, "Curvelets," Available: http://www-stat.stanford.edu/~donoho/reports/1999/curvelets.pdf.

[15] B. Mahesh and W. A. Pearlman, "Hexagonal sub-band coding for inages," ICASSP, vol. 3, 1953-1956, 1989.

[16] D. Taubman and A. Zakhor, "Orientation adaptive sub-band coding of images," IEEE trans. on Image Processing, vol. 3, no 4, 421-437, 1994.

[17] D. Wang, L. Zhang and A. Vincent, "Curved wavelet transform for scalable video coding," ISO/IEC JTC1/SC29/WG11, MPEG doc M10535, Munich, 2004.

[18] C. N. Zhang and X. Wu, "A hybrid approach of wavelet packet and directional decomposition for image compression," IEEE Canadian Conf. on Electrical and Computer Engineering, vol. 2, 755-760, 1999.

[19] P. Carre, E. Andres, C. F. Maloigne, "Discrete rotation for directional orthogonal wavelet packets," ICIP, vol. 2, 257-260, 2001.

[20] N. V. Boulgouris, D. Tzovaras, M. G. Strintzis, Lossless image compression based on optimal prediction, adaptive lifting, and conditional arithmetic coding, IEEE trans. on Image Processing, vol. 10, no. 1, 1-14, 2001.

[21] M. Vetterli and J. Kovacevic, "Wavelets and sub-band coding," Prentice Hall Englewood Cliffs, N.J. 1995.

[22] T. Wiegand, G. J. Sullivan, G. Bjntegaard, A. Luthra, Overview of the H.264/AVC video coding standard, IEEE trans. CSVT, vol. 13, no. 7, 2003.

[23] I. Daubechies and W. Sweldens, "Factoring wavelet transforms into lifting steps," Journal of Fourier Anal. Appl., vol. 4, no 3, 247-269, 1998.

Wherefore, what is claimed is:

1. A system for encoding a two dimensional (2D) signal, comprising:
   a general purpose computing device;
   a computer program comprising program modules executable by the general purpose computing device, wherein the computing device is directed by the program modules of the computer program to,
   input a two dimensional (2D) signal;
   transform said 2D signal using directional prediction based on spatial correlations of edges in an image, wherein the spatial correlations are based on directional angles, selectable from 0 to 360 degrees based on blocks of pixels in the image, and at least one lifting wavelet to obtain output coefficients representing the two dimensional signal, directional angles based on the edges in the image, and modes representing sizes of image blocks, wherein the directional angles are estimated by:
   partitioning an image block into three sets of progressively smaller blocks of block modes, wherein a first block mode is a large block of pixels, a second block mode is smaller than the first block of pixels and a third block mode is a sub-set of the second block of pixels, and wherein in the first block mode all pixels have the same directional angle; and wherein the third block mode each block has 16 directional angles and all pixels in the third block mode share the same angles;
estimating the directional angle for a wavelet transform in the vertical direction by $$\sum_{m=m_0}^{m_0+16}\sum_{n=n_0}^{n_0+8}|h(m,n)|+\lambda_v R_v$$

where h(m,n) are high-pass coefficients after the wavelet transform in the vertical direction; $R_v$ are the number of bits to code the block mode and directional angle; $\lambda_v$ is an optimization factor and $(m_0,n_0)$ are the coordinates of the left-upper pixel of h(m,n), and
estimating the directional angle for a wavelet transform in the horizontal direction by $$\sum_{m=m_1}^{m_1+8}\sum_{n=n_1}^{n_1+8}|lh(m,n)|+\lambda_h R_h$$

where lh(m,n) are the coefficients of a low high sub-band; $R_h$ are the number of bits to code the mode and directional angles; $\lambda_h$ is an optimization factor and $(m_1,n_1)$ are the coordinates of the left-upper pixel of lh(m,n); and
entropy encode the output coefficients, directional angles and modes thereby generating an encoded version of the input signal.

2. The system of claim 1 wherein the program module to transform said 2D signal, comprises sub-modules to:
perform a first one dimensional wavelet transform in the vertical direction with sub-modules to;
split the first one dimensional wavelet transform in the vertical direction into even and odd polyphase samples;
predict odd polyphase samples from neighboring even polyphase samples wherein the predicting signals are directionally selected at an angle along edges in the image;
update even polyphase samples using said predicted odd polyphase samples wherein the updating signals are directionally selected at an angle along edges in the image; and
output the coefficients of the predicted and even polyphase samples;
perform a second one dimensional wavelet transform in the horizontal direction with sub-modules to;
split the second one dimensional wavelet transform in the horizontal direction into even and odd polyphase samples;
predict odd polyphase samples from neighboring even polyphase samples wherein the predicting signals are directionally selected at an angle along edges in the image;
update even polyphase samples using said predicted odd polyphase samples wherein the updating signals are directionally selected at an angle along edges in the image; and
output the coefficients of the predicted and even polyphase samples.

3. The system of claim 2 wherein for the first one dimensional wavelet transform in the vertical direction and the second one dimensional wavelet transform in the horizontal direction, the even polyphase samples are updated using the predicted odd polyphase samples in which the updating signals are selected along an angle at the same direction as for predicting the odd polyphase samples.

4. The system of claim 1 further comprising a program module to output the entropy encoded coefficients, directional angles and modes to a bit stream.

5. The system of claim 2 wherein the angle of the first 1D transform is not vertical to that of the second 1D transform.

6. The system of claim 2 wherein the entropy encoded version of the input signal is decoded by;
entropy decoding the entropy encoded version of the input signal and directional angles and modes,
dividing the input signal into two one dimensional signals,
for each one dimensional signal decoding said signal by,
extracting the coefficients of the predicted odd and updated even polyphase samples,
using the predicted odd polyphase samples and updated even polyphase samples to extract the original even polyphase samples wherein the predicted odd polyphase samples are used according to decoding angles and modes,
using the original even polyphase samples and predicted odd polyphase samples to extract the original odd polyphase samples wherein the original even polyphase samples are used according to decoding angles and modes;
combining the even and odd polyphase samples to create a one dimensional wavelet transform, and
creating an image based on the decoded one dimensional signals.

7. The system of claim 2 wherein the predicting signals are selected from even polyphase samples defined by a directional angle and a mode.

8. The system of claim 7 wherein the directional angle is used in updating the even polyphase samples to minimize the number of bits necessary to encode the angle data.

9. The system of claim 2 wherein the predicting signals or the updating signals come from fractional samples.

10. The system of claim 9 wherein the fractional samples are calculated with an interpolation approach.

11. The system of claim 10 wherein for a fractional pixel belonging to $x_e(m,n)$, the interpolation is described as $$x_e(m+\text{sign}(i-1)tg(\theta),n+i)=\sum_k a_k x_e(m+k,n+i)$$

where k is the integer around $\text{sign}(i-1)tg(\theta)$ and $a_k$ is a parameter of an interpolation filter.

12. The system of claim 2 wherein the predicted and updated samples are expressed as integers.

13. The system of claim 1 wherein the block size of the first block mode is 16×16 pixels, the block size of the second block mode is 8×8 pixels and the block size of the third block mode is 4×4 pixels.

14. The system of claim 1 wherein the directional angle of a block is coded by using the directional angle of adjacent blocks, wherein given a first row of two blocks with respective angle b and angle d above a second row of blocks below said first row with angle a and angle c, if the absolute difference between angles b and d is greater than the absolute difference between angles b and a, then angle a is used as the prediction; otherwise angle d is used as the prediction.

15. The system of claim 1 wherein the input signal comprises a video signal.

16. A computer-implemented process for encoding image data, comprising:
 using a computer to perform the process actions of:
 using a reversible transform component that receives an input signal and provides an output of quantized coefficients corresponding to the input signal, the output of quantized coefficients being based, at least in part, upon a reversible transform obtained via matrix lifting and directional prediction that corresponds to spatial correlations based on angular direction, selectable from 0 to 360 degrees, of edges in an image, wherein the process action of using a reversible transform component that receives an input signal and provides an output of quantized coefficients corresponding to the input signal, the output of quantized coefficients being based, at least in part, upon a reversible transform obtained via matrix lifting and directional prediction that corresponds to edges in the image, comprises:
 inputting a two dimensional (2D) signal; and
 transforming said 2D signal using directional prediction and at least one lifting wavelet, comprising:
 performing a one dimensional (1 D) wavelet transform in the vertical direction;
 performing a one dimensional wavelet transform in the horizontal direction; wherein each one dimensional wavelet transform comprises,
  splitting the one dimensional wavelet transform in the vertical direction into even and odd polyphase samples;
  predicting odd polyphase samples from neighboring even polyphase samples wherein the predicting signals are directionally selected at an angle along edges in the image and wherein the prediction of the even polyphase samples $$U_k(m, n) = \sum_j u_j h(m + \text{sign}(j)tg(\theta_v), n + j)$$

where tg( )/=sin( )/cos( ), $\theta_v$ is a directional angle, j is an integer number, $u_j$ is an updating parameter which is decided by a wavelet filter and h(m,n) is the predicted residue; and
  updating even polyphase samples using said predicted odd polyphase samples wherein the updating signals are directionally selected at an angle along edges in the image;
  outputting the coefficients of the predicted and even polyphase samples; and
 entropy encoding the output coefficients and an angle representing edges in an image thereby generating an encoded version of the input signal in integer form.

17. The computer-implemented process of claim 16 wherein the angle representing the edges in the image are computed using blocks of image data.

18. The computer-implemented process of claim 17 wherein a mode representing the blocks of image data are entropy encoded with the output coefficients and the angle representing the edges in the image.

19. The computer-implemented process of claim 16 wherein said process actions are stored on a computer-readable medium.

20. The computer-implemented process of claim 16 wherein the input signal comprises an image signal.

21. The computer-implemented process of claim 16 wherein the input signal comprises a video signal.

22. The computer-implemented process of claim 16 wherein a Haar filter is used in performing a one dimensional wavelet transform in either the vertical direction or the horizontal direction.

23. The computer-implemented process of claim 16 wherein a 5/3 filter is used in performing a one dimensional wavelet transform in either the vertical direction or the horizontal direction.

24. The computer-implemented process of claim 16 wherein a 9/7 filter is used in performing a one dimensional wavelet transform in either the vertical direction or the horizontal direction.

25. The computer-implemented process of claim 16 wherein the predictions of x(m,2n+1) that come from the even polyphase samples are calculated by, $$P_{x_e}(m, n) = \sum_i p_i x_e(m + \text{sign}(i-1)tg(\theta_v), n + i)$$

where $tg() = \sin()/\cos()$.

26. The computer-implemented process of claim 16 wherein the angle representing the edges in the image are estimated by the process actions of:
 for each block of a set of blocks of image data,
  finding the best predicting angle and image block size mode from a set of candidate angles and image block size modes in the vertical direction;
  using the best predicting and image block mode in the vertical direction when performing the 1D vertical transform;
  finding the best predicting angle and image block size mode from a set of candidate angles and image block size modes in the horizontal direction; and
  using the best predicting and image block mode in the horizontal direction when performing the 1D horizontal transform.

27. A computer-implemented process for decoding an entropy encoded version of an input signal obtained using directional prediction based on angles, selectable from 0 to 360 degrees, representing spatial correlations of edges in an image, at least one lifting wavelet and modes representing sizes of image blocks, comprising:
 using a computer to perform the process actions of:
 entropy decoding the entropy encoded version of the input signal obtained using directional prediction based on angles, selectable from 0 to 360 degrees, representing spatial correlations of edges in the image, at least one lifting wavelet and modes representing sizes of image blocks and directional angles and modes, wherein the angles are estimated by:
  partitioning an image block into three sets of progressively smaller blocks of block modes, wherein a first block mode is a large block of pixels, a second block mode is smaller than the first block of pixels and a third block mode is a sub-set of the second block of pixels, and wherein in the first block mode all pixels have the same directional angle; and wherein the third block mode each block has 16 directional angles and all pixels in the third block mode share the same angles;
  estimating a directional angle for a wavelet transform in the vertical direction by $$\sum_{m=m_0}^{m_0+16}\sum_{n=n_0}^{n_0+8}|h(m,n)|+\lambda_v R_v$$

where h(m,n) are high-pass coefficients after the wavelet transform in the vertical direction; $R_v$ are the number of bits to code the block mode and directional angle; $\lambda_v$ is an optimization factor and $(m_0,n_0)$ are the coordinates of the left-upper pixel of h(m,n), and estimating a directional angle for a wavelet transform in the horizontal direction by $$\sum_{m=m_1}^{m_1+8}\sum_{n=n_1}^{n_1+8}|lh(m,n)|+\lambda_h R_h$$

where lh(m,n) are the coefficients of a low high sub-band; $R_h$ are the number of bits to code the mode and directional angles; $\lambda_h$ is an optimization factor and $(m_1,n_1)$ are the coordinates of the left-upper pixel of lh(m,n), dividing the input signal into two one dimensional signals,
for each one dimensional signal decoding said signal by,
  extracting coefficients of predicted odd and updated even polyphase samples,
  using the predicted odd polyphase samples and updated even polyphase samples to extract the original even polyphase samples wherein the predicted odd polyphase samples are used according to decoding angles and modes,
  using the original even polyphase samples and predicted odd polyphase samples to extract the original odd polyphase samples wherein the original even polyphase samples are used according to decoding angles and modes;
  combining the even and odd polyphase samples to create a one dimensional wavelet transform, and
creating an image based on the decoded one dimensional signals.

* * * * *